UNITED STATES PATENT OFFICE.

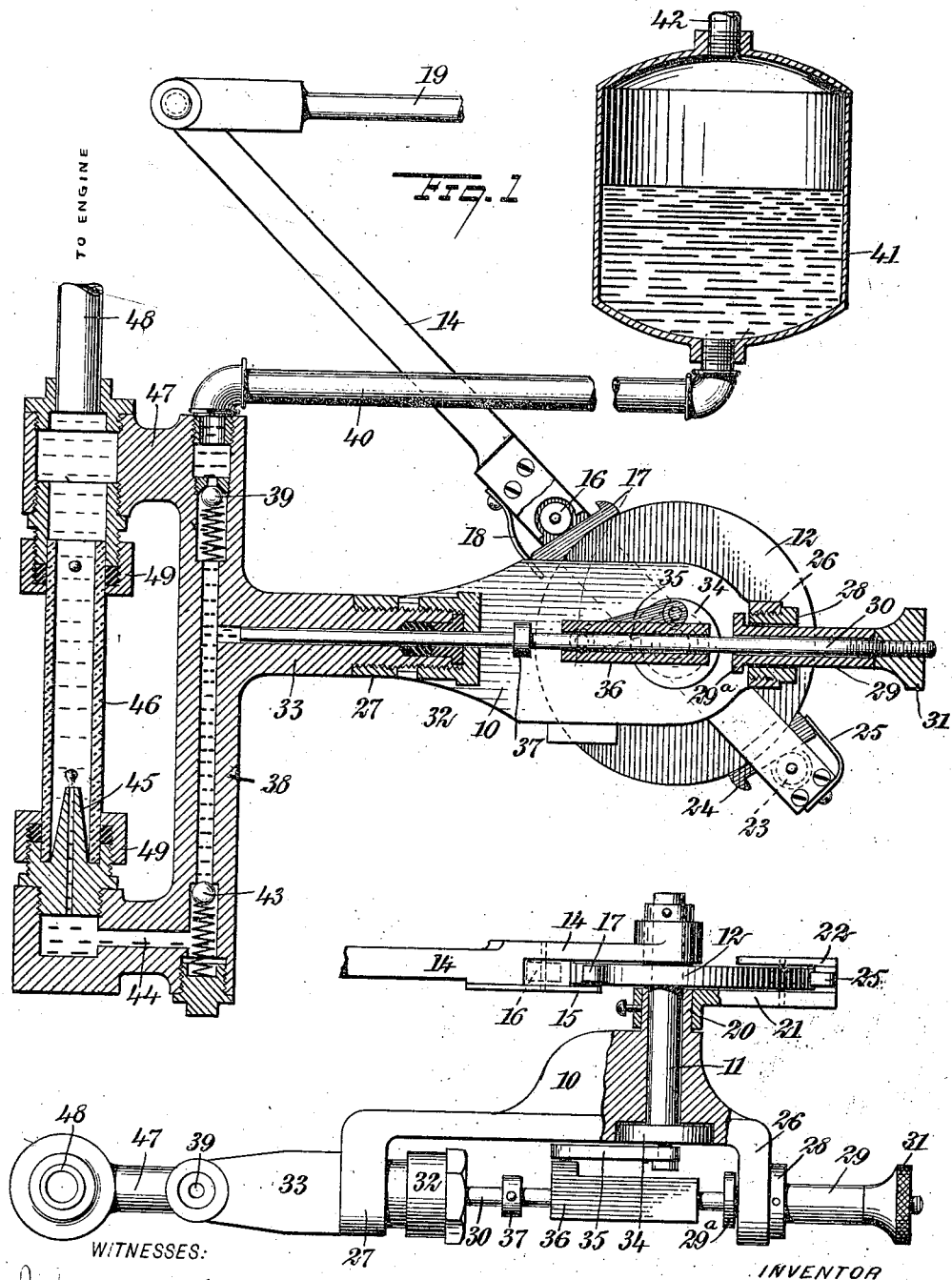

NATHAN McCOY, OF MARSHALLTOWN, IOWA.

SIGHT-FEED LUBRICATOR.

No. 873,875.   Specification of Letters Patent.   Patented Dec. 10, 1907.

Application filed July 17, 1905. Serial No. 269,949.

*To all whom it may concern:*

Be it known that I, NATHAN McCOY, a citizen of the United States, and a resident of Marshalltown, in the county of Marshall and State of Iowa, have invented a new and Improved Sight-Feed Lubricator, of which the following is a full, clear, and exact description.

The invention relates to a lubricator intended particularly for use in connection with steam engines, but capable of other applications as will fully appear hereinafter.

The object of the invention is to provide a device of that class in which the pump is utilized to force the lubricant through a transparent tube into the steam pipe or other part of the engine so that the manner in which the lubricant is being fed may be observed by the attendant.
The invention resides in certain novel features of construction and relative arrangement of parts which will be fully set forth hereinafter and particularized in the claims.

Reference is to be had to the accompanying drawings which illustrate as an example the preferred embodiment of my invention, in which drawings Figure 1 is a sectional view of the invention; and Fig. 2 is a plan view with parts broken away.

The apparatus has a suitable frame 10 on which is revolubly carried a shaft 11. This shaft has a friction disk 12 attached thereto and coacting with said disk is an arm 14 which is arranged to swing on the shaft 11 alongside of the friction disk. The arm has a bracket 15 attached thereto, and in this bracket is held a roller 16 which coacts with a wedge 17 lying between the roller and the periphery of the friction disk 12.

18 indicates a spring yieldingly pressing the wedge 17 into active position. The arm 14 is connected by a link 19 or other means with a moving part of the engine so that upon the operation of the engine the arm 14 is driven in unison with the engine. Upon swinging the arm 14 from left to right (referring to Fig. 1), the roller 16 will tend to ride down the wedge 17 and movement will not be imparted to the disk 12 from said arm. Upon reversing this direction of movement, however, the roller 16 will tend to ride up on the wedge 17 and force the wedge in between the roller and friction disk, and causing the disk and shaft 11 to turn with the arm. The frame 10 has a tubular extension 20 to which an arm 21 is keyed. This arm is located at the side of the disk 12 opposite the arm 14, and has a bracket 22 carrying a roller 23 which coacts with a wedge 24 and spring 25, the same as the parts 16, 17 and 18 before described. Said wedge and spring, however, are arranged oppositely with respect to the wedge 17 and spring 18 and when the disk 12 is moving under the action of the arm 14 the disk tends to push the wedge 24 from under the roller 23 and said wedge does not interfere with the movement of the disk. When, however, the arm 14 is returning from left to right to recover its engagement with the disk, should the disk tend to turn from left to right with the arm it will ride the wedge 24 tight in under the roller 23 and this will stop the movement of the disk. It will be seen, therefore, that these parts 21, 23, 24 and 25 act as a dog for stopping idle movement of the disk. By these devices the shaft 11 is given a continuous step by step movement in unison with the operation of the engine or other machine in connection with which the lubricator is used.

The frame 10 has a bracket 26 at one end, and a bracket 27 at the other end, which brackets are in alinement with each other, as shown. The bracket 26 carries a bushing 28 in which is loosely fitted a sleeve 29, the inner end of which terminates in a flange 29ª. Fastened to the sleeve 29 is a plunger rod 30, the outer end of which is threaded to engage a nut 31 which permits of the adjustment of the relative position of the sleeve 29 and rod 30. The opposite end of the plunger rod 30 passes through a stuffing box 32 formed on the inner end of the pump barrel 33 which is fastened by threads or otherwise in the bracket 27. The shaft 11 has a crank disk 34 attached to its inner end, and this disk is connected by a link 35 with a sleeve 36 which slides freely on the plunger rod 30.

37 indicates a collar attached to the rod 30 adjacent to the stuffing box 32. It will be seen that as the shaft 11 rotates the slide 36 moves on the plunger rod and upon striking on one hand the collar 37 and on the other the flange 29ª of the sleeve 29 a back and forth movement will be imparted to the plunger rod 30. The degree of this movement may be readily regulated by adjusting the position of the nut 31 and sleeve 29.

The pump barrel 33 communicates with a chamber 38, the walls forming which are preferably integral with the pump barrel, and the communication between the pump barrel and chamber being intermediate the ends of the chamber. At the receiving end the chamber is provided with an automatic valve 39 to which a tube 40 leads from the lubricant reservoir 41. The upper part of this reservoir is in communication with the boiler or other source of fluid pressure by a pipe 42 passing into the top of the reservoir. In this manner the lubricant is positively fed into the chamber 38 and barrel 33 without depending upon the sucking action of the pump plunger rod 30. At the discharge end the chamber 38 has an automatic valve 43 preventing the return of the lubricant to the chamber, and said chamber discharges through a branch 44 into a dropping nipple 45. This nipple in turn discharges into a transparent feed tube 46 which passes through a branch 47 on to the engine by way of a pipe 48 or other means. At each end the glass tube 46 is supplied with a stuffing box 49 effecting a tight joint. In practice the tube 46 and branch 47 is filled with water, and the lubricant is permitted to flow in drops upward through the water so that the feeding of the lubricant may be observed. The water keeps the oil in separate drops and enables the feed to be clearly seen.

In the operation of the device, the link 19 being in connection with the moving part of the engine, the vibration of the arm 14 will cause the shaft 11 to rotate and the plunger rod 30 to be driven or struck, all of which depends upon the adjustment of the elements 29 and 31. The boiler pressure forces the lubricant past the valve 39 into the chamber 38 and the plunger rod 30 in coming forward forces a part of the lubricant out through the valve 43. This it will be observed provides for extremely delicate adjustment of the oil supply, the pump being used solely as a means for passing out the desired quantity of lubricant as contra-distinguished from performing as well the function of drawing the lubricant into the pump.

Having thus described the preferred form of my invention, what I claim as new and desire to secure by Letters Patent is:

1. A lubricator, comprising a vertical chamber having lateral members, the lower member communicating with the chamber, and the upper one being tubular, automatic admission and outlet valves adjacent to the ends of the chamber, a pump barrel at right angles to and communicating with the chamber intermediate of its ends, a plunger in the barrel, means for operating the plunger, a reservoir connected with the admission end of the chamber and adapted to contain lubricant under pressure, a nipple secured to the lower member of the chamber, a transparent feed tube having its lower end secured to the nipple with the nipple projecting into the same and its upper end secured to the upper member, and a pipe connected with the said upper member of the chamber.

2. A lubricator, comprising a vertical chamber, admission and outlet valves adjacent to the ends of the chamber, a pump barrel at right angles to and communicating with the chamber intermediate of its ends, a plunger in the barrel, means for operating the plunger, a reservoir connected with the upper end of the chamber and adapted to contain a lubricant, a transparent feed tube supported at one side of and parallel with the chamber, and a nipple in communication with the lower end of the chamber and projecting into the feed tube.

3. In a lubricator, a chamber, automatic admission and outlet valves for the chamber, a feed pipe connected with one end of the chamber, a pump barrel extending at right angles from the chamber between the valves thereof, a frame having brackets to one of which the pump barrel is secured, a plunger in the pump barrel and projecting out through one end of the barrel and having guided movement in the other bracket of the frame, spaced stops on the projecting end of the plunger, a slide on the plunger between the stops thereon, a shaft mounted in the frame and having a crank at one end, a link connecting the crank with the slide, and means for operating the shaft.

4. In a lubricator, a pump, admission and outlet valves for the pump, a lubricant reservoir connected with the pump, a frame having oppositely arranged brackets, to one of which the pump is secured, a sleeve in the other bracket of the frame and having a flanged inner end, a plunger in the pump and having its outer end screw threaded and projecting through the said sleeve, a nut on the threaded end of the plunger, a collar secured to the plunger adjacent to the pump, a slide on the plunger between the collar and flange of the sleeve, a shaft mounted in the frame and having a crank at one end, a link connecting the crank with the slide and means for operating the shaft.

5. In a lubricator, a chamber, automatic admission and outlet valves for said chamber, a lubricant reservoir connected with the upper end of the chamber, a pump barrel communicating with the chamber, a plunger in the pump barrel, means for operating the plunger, a branch leading from the lower end of the chamber, a nipple carried by the branch, a feed pipe, and a transparent feed tube arranged between the branch and feed pipe and into which the nipple discharges.

In testimony whereof I have signed my name to this specification in the presence of two subscribing witnesses.

NATHAN McCOY.

Witnesses:
   B. F. CUMMINGS,
   G. A. MOTE.